Dec. 3, 1929.                A. GRAF                1,738,240
PAN CLEANING AND GREASING MACHINE
Filed Oct. 25, 1928
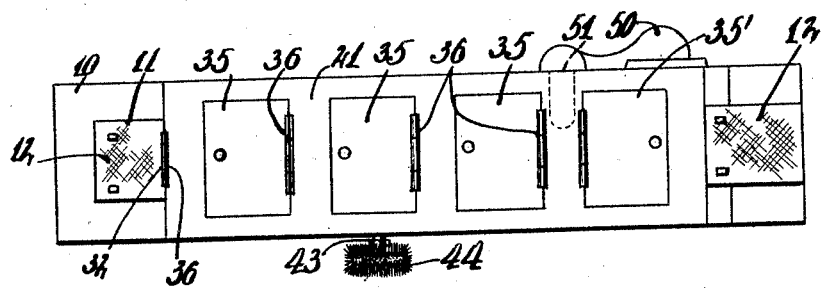
Fig.1.
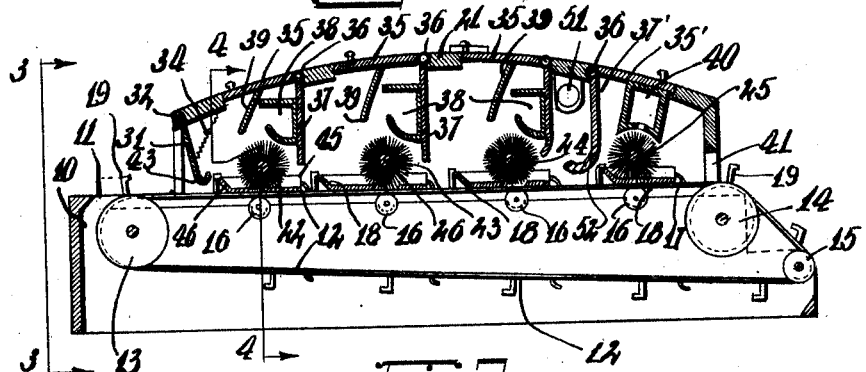
Fig.2.
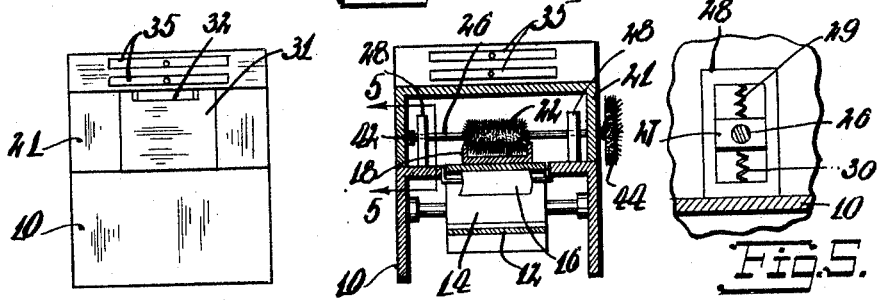
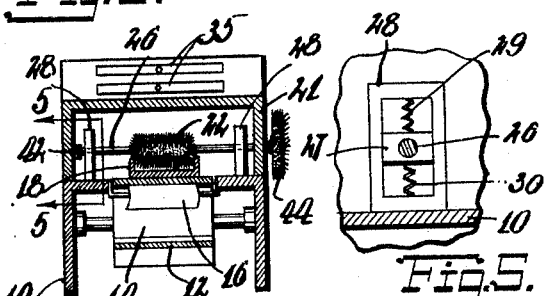
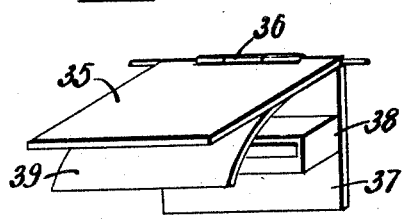
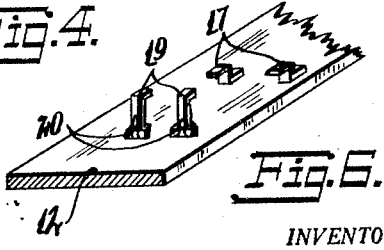
Fig.3.   Fig.4.   Fig.5.
Fig.7.   Fig.6.
INVENTOR.
Alfons Graf
BY
ATTORNEY Patented Dec. 3, 1929

1,738,240

UNITED STATES PATENT OFFICE

ALFONS GRAF, OF NEW YORK, N. Y.

PAN CLEANING AND GREASING MACHINE

Application filed October 25, 1928. Serial No. 315,023.

This invention relates generally to labor saving machinery and has more particular reference to a novel pan cleaning and greasing machine.

The invention has for an object the provision of a device of the class mentioned which is of simple durable construction, desirable in use and efficient in action, and which can be manufactured and sold at a reasonable cost.

The invention proposes the use of a conveyor belt arranged for carrying pans to be cleaned beneath a hollow base structure of the machine. A plurality of brushes are mounted within the hollow base and arranged for engaging in succession against the pans so as to clean them. The first of these brushes is of quite rough structure, the second finer, the third still finer, etc. The greasing means is arranged in contact with the last brush so that as the pans pass by they may be greased. This greasing means may be lifted out of contact with the last brush in the event that the pans are not required to be greased.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a plan view of a device constructed according to this invention.

Fig. 2 is a longitudinal vertical sectional view thereof.

Fig. 3 is an end view of the device, looking in the direction of the arrows 3—3 of Fig. 2.

Fig. 4 is a vertical sectional view, taken on the line 4—4 of Fig. 2.

Fig. 5 is a fragmentary enlarged detail vertical sectional view, taken on the line 5—5 of Fig. 4.

Fig. 6 is a fragmentary perspective view of a portion of the conveyor belt.

Fig. 7 is a perspective view of one of the covers and associated parts used in the machine.

The reference numeral 10 indicates generally a hollow base having a top opening 11 thru which a conveyor belt 12 extends. The top portion of this conveyor belt closes the opening 11. The conveyor belt is mounted upon a driving roller 13 supported within the hollow base 10 and idler rollers 14 and 15 rotatably mounted within the same hollow base.

A plurality of idler rollers 16 are rotatably mounted in the base 10 and serve for holding the top portion of the conveyor belt against downward sagging. The conveyor belt has a plurality of stationary clips 17 secured on its outer side for holding one of the ends of pans 18 placed upon the belt. Co-acting with these stationary clips are a plurality of pivoted clips 19 urged in one direction by springs 20 co-axially mounted on the pivot points thereof so that these clips engage the other sides of the pans 18.

A hood 21 is mounted upon the base 10 and has several brushes 22, 23, 24, and 25 rotatably mounted so as to press against the top portion of the conveyor belt. The brush 22 has very stiff bristles, brush 23 finer bristles, brush 24 still finer bristles, and 25 still finer ones. These brushes are all fixed on shafts such as 26 mounted in bearing slides 27 slidably held in standard plates 28 projecting from the top of the base 10. Springs 29 and 30 act between the standard plates 28 and the slides 27 for normally urging the brushes downwards against the top of the conveyor belt 12. Preferably the rollers 16 are located in vertical alignment with the brushes.

The hood 21 has an entrance door 31 pivotally mounted at its top edge 32 and having a curved bottom end 33 resting against the conveyor belt 12. An expansion spring 34 acts against the base 21 and the door 31 for normally urging the door closed against the conveyor belt 12. The pan to be cleaned may be engaged upon that portion of the conveyor belt disposed on the outside of the door, and upon forward motion of the belt the pan acts against the entrance door 31 forcing it open against its spring 34 so that the pan may enter the device. Spring 34 then acts to close the door again.

Directly above each of the brushes there are a plurality of covers 35 hingedly mounted on one of their ends 36 on the hollow base 21. Plate supports 37 project downwards from the covers 35 and are rigidly connected with the covers so as to move with them. Containers 38 are attached on the support plates 37 and guide vanes 39 are attached to the covers 35. These guide vanes are so shaped that particles broken from the pans 18 and thrown upwards by the revolving brushes strike against these guide vanes and are directed into the containers 38.

Directly over the last brush 25 there is a cover 35' mounted similarly to covers 35, and this cover is provided with a downwardly projecting partition plate 37', and with a grease container 40. The grease container rests against the brush 25 so as to deposit some of its contents upon the brush when the brush rotates. The hollow base 21 is provided with an exit opening 41 at its rear side.

Each of the shafts 26 are provided with driving rollers 42 for connection with some driving means so as to rotate the brushes. One of the shafts 26 projects out of the front side of the casing 21 as at 43 and a buffer brush 44 is attached on this extended end.

In operation of the device pans are placed upon the conveyor belt 12 at the front of the device and secured in place upon the belt by the clips 17 and 19. As the belt moves forward, the door 31 opens allowing the pans to enter within the hood 21. These pans are provided with front opened ends 45 and rear inclined ends 46. As a pan moves forward, it engages with its opened end beneath the first brush 22. Rotation of this brush cleans the pan, and as the pan continues to move forward the inclined side 46 causes the brush 22 to move upwards, this being possible by reason of the springs 29 and 30 and then, when the pan passes, the brush moves downward to its normal position.

Continued motion of the belt next moves the pan beneath the second brush 23 and then the third and fourth brushes of the machine. Each of these brushes clean the pan and then move upwards for allowing it to pass. Attention is called that the brushes have bristles projecting around its periphery and also from its sides as seen in Fig. 4, so that the sides of the pans are also cleaned. Particles of cake or other foods broken from the pans are thrown upwards by the rotation of the brushes and directed into the containers 38 by reason of the guide vanes 39. Periodically the covers 35 may be tilted upwards for moving the support plates 37 to the outside of the machine. Then the particles collected within the containers 38 may be removed. The machine may be modified and an air supply pipe arranged for aiding the brushes in throwing particles against the vanes 39, and then into the containers 38.

An air blower 50 is provided to blow air thru pipes 51 and the blast is directed forward toward the cleaning brushes by guide plate 52 forming an extension of plate 37'.

While I have shown and described the preferred embodiment of my inventoin, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, a hollow base, a conveyor belt mounted therein and having a horizontally extending top portion, a hood on said base, a brush transversely mounted across the top portion of the conveyor belt and rotatably supported in the hood, a horizontal door hingedly mounted in the top of the hood, a vertical support plate projecting downwards from the door in the vicinity of the hinge and positioned along one side of the said brush, a guide vane projecting downwards from the door and extending along the other side of the brush, and a container with an open front secured upon the support plate for receiving particles cleaned from pans carried along by the conveyor belt and thrown by the brush against the guide vane.

2. In a device of the class described, a hollow base, a conveyor belt mounted therein and having a horizontally extending top portion, a hood on said base, a brush transversely mounted across the top portion of the conveyor belt and rotatably supported in the hood, a horizontal door hingedly mounted in the top of the hood, a vertical support plate projecting downwards from the door in the vicinity of the hinge and positioned along one side of the said brush, a guide vane projecting downwards from the door and extending along the other side of the brush, and a container secured upon the support plate for receiving particles cleaned from pans carried along by the conveyor belt and thrown by the brush against the guide vane.

In testimony whereof I have affixed my signature.

ALFONS GRAF.